UNITED STATES PATENT OFFICE.

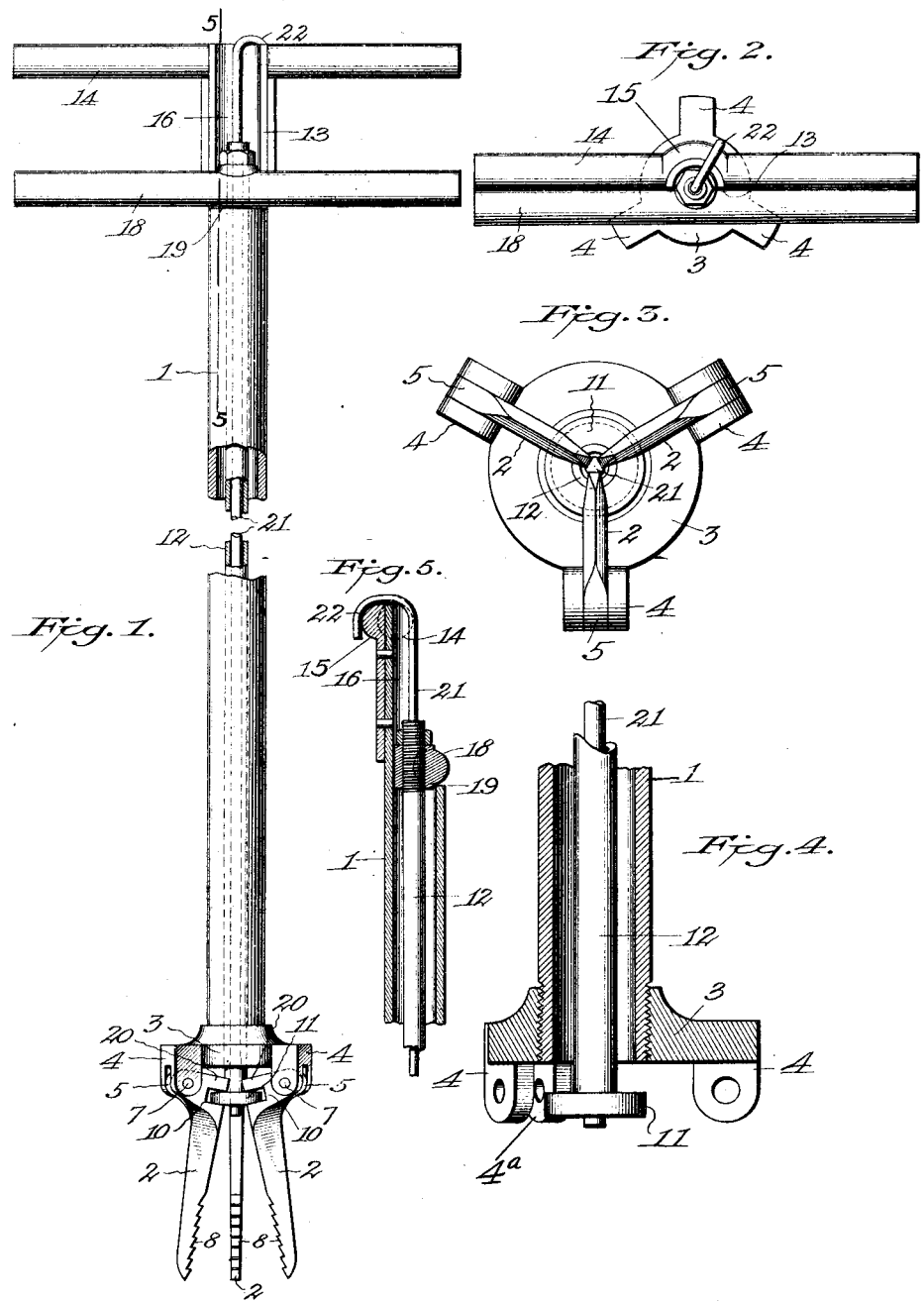

ABRAM T. AUTER, OF DENVER, COLORADO.

WEED-EXTRACTING TOOL.

1,025,360.  Specification of Letters Patent.  Patented May 7, 1912.

Application filed June 3, 1911. Serial No. 631,108.

*To all whom it may concern:*

Be it known that I, ABRAM T. AUTER, a citizen of the United States of America, residing in the city and county of Denver and State of Colorado, have invented a new and useful Weed-Extracting Tool, of which the following is a specification.

My invention relates to an improved dandelion and weed extracting tool, and the objects of my invention are: first, to provide a dandelion extractor that can be applied to grip and that will hold to the roots of dandelions, and will extract their tops and roots quickly and at one operation; and second, to provide a dandelion and weed extractor that will extract dandelions and weeds bodily, tops and roots together, or that is adapted to permit acids or poisonous chemical solutions or powder to be applied to their tops and roots. I attain these objects by the mechanism illustrated in the accompanying drawings, in which:

Figure 1 is a side elevation of the improved implement partly broken away for clearer illustration, Fig. 2 is a top view of the same, Fig. 3 is a bottom view, full size, Fig. 4 is a vertical sectional view through the lower end of the implement, the jaws being omitted; and Fig. 5 is a vertical sectional view through the upper end of the implement on the line 5—5 of Fig. 2.

Similar letters of reference refer to similar parts throughout the several views.

Referring to the drawings, the numeral 1 designates an outer casing tube. This casing tube forms the outside body or casing portion of my dandelion and weed extractor, and to the lower end of this tubular body portion I place two or three or more opening and closing dandelion and weed gripping jaws 2, which are connected to the tube in the following manner: A disk 3 is secured to the lower end of the tube, preferably by being threaded thereto. The peripheral edge of the disk is provided with the same number of lugs 4, as there are jaws, and these lugs are at equal distances apart, and in the center of each of these lugs, a slot 4ª is formed and each jaw is provided with an off-set lug portion 5 at its inner end, which is pivotally secured by a pin 7. Not less than two of these jaws can be used, but two or three or more may be used if desired. I preferably illustrate three of these dandelion and weed extracting jaws, however. These jaws comprise knife-blade-like members which are of sufficient length to reach far enough down on the roots of dandelions and weeds to grip and remove them from the ground, and they are provided with narrow edges that are provided with ratchet teeth 8, that lean toward the end of the tube, and their sides slope toward the outer free ends of the jaws. These jaws are also preferably arranged to taper on both sides from their toothed edges to a dull knife edge along their back edges. These three jaws are arranged to come together and center in central alinement with the axis of the tubular body portion of the extractor.
These jaws are each provided with narrow recessed slots 10, at their inner end portions, in which a disk 11 fits loosely. This disk is secured in any suitable manner to one end of a tube 12, preferably by being riveted thereto; the tube 12 extends loosely through the tube 1 that forms the body of the extractor. This inner tube is open and entirely unobstructed throughout its length, and I term this tube the jaw operating tube. It is also adapted to convey chemical solutions to the roots of weeds or dandelions, and it extends to near the opposite end of the body tube.

One half of the diameter of the upper or handle portion of the body tube is cut away for about a couple of inches of the length of the body tube as shown at 13, and a handle 14 is secured around the end of the remaining half portion of the body tube, by any suitable means. The hub portion 15 of the handle, however, is made of a semi-circular form and extends in a semi-circular form around the semi-circular terminal end of the tube, and is preferably secured to the tube by being riveted thereto. This arrangement of the end of the tube and its handle is made in order to leave the semi-circular curved recess 16 of the remaining half of the body tube unobstructed so that chemical solutions can be readily poured into the adjacent end of the jaw operating or chemical solution tube. The adjacent end of the jaw operating and chemical solution tube is left open, and it is also provided with a handle 18 that is provided with an off-set hub portion that projects into the semi-circular recess of the half of the body tube that fits over the jaw operating tube. The cutting away of half of the body tube is arranged to leave a square shoulder 19 at its inner end, and the outer end of the jaw and chemical tube and its handle are so relatively positioned to this shoulder as to have a short reciprocative movement against and away from this shoulder, which reciprocative movement is sufficient to open and close the jaws. This opening and closing movement of the jaws is effected by the reciprocative movement of this tube in the following manner: The recesses in the jaws are positioned in the toothed edge portion, and at a sufficient distance from the pivotal pin portions to cause the jaws to rock or swing on their pivotal pins simultaneously when the tube is reciprocated. The handle of the jaw operating tube, however, normally rests by the weight of the jaw tube against the shoulder 19 of the body tube, and the tube and the disk and the recesses in the jaws are arranged so that the jaws are extended out to their fullest wide open position, and then when the handle of the jaw tube is grasped and the jaw tube is pulled up, the three jaws move simultaneously together centrally of the tube, and their heel portions 20 are arranged to strike against the under side of the disk at the lower end of the body tube, which defines the upward movement of the jaw tube.

In order to remove any roots or weeds which may become wedged in between the jaws 2, I employ a rod 21, which extends down through the tube 12, and may project slightly below its lower end. The upper end of the rod may engage the handle in any suitable manner to normally hold the rod up in the position shown in Fig. 1. As illustrated, however, the upper end of the rod is formed with a hook 22, which may be sprung over the handle 14, when the rod is not used and by disengaging the hook from the handle 14, the rod may be pushed down through the tube 12 to dislodge any roots or weeds which may have become wedged in between the jaws.

The operation of extracting dandelions and weeds is as follows: The extractor is held in the hands by the handle of the casing tube, and the jaws, which always stand wide open, are placed over a dandelion and downward pressure enough is applied to the handle to press the jaws into the ground their full length. The operator then grasps the handle of the jaw operating tube, and pulls upon it, while at the same time pressing down on the casing tube handle, and the short upward movement of this jaw tube closes the jaws around the root of the dandelion. The operator then lifts the extractor up from the ground, and this movement embeds the ratchet teeth of the jaws into the root of the dandelion and draws the dandelion with it.

When it is desired to apply a poisonous acid or chemical solution or a powder to weeds, the extractor is placed over the plant and is pressed more or less into the ground, as desired, and the material is poured into the top of the jaw tube, which is open throughout its whole length, and runs onto and around the weed.

Having described my invention, what I claim as new and desire to secure by Letters Patent, is:

1. A dandelion and weed extractor, comprising a casing, a tube reciprocally mounted within said casing, jaws pivotally mounted at the lower end of said casing and connected to the lower end of said tube and arranged to be closed and opened by reciprocal movement of said tube, a root ejecting rod within said tube, and means connected with said casing and tube for manually operating the same.

2. A dandelion and weed extractor provided with a hollow handle at its upper end and with jaws pivotally secured to its lower end to swing from a closed position to an open position, a tube reciprocally mounted within said casing provided with a handle at its upper end and connected to said jaws at its lower end in such a manner that manual reciprocative movement of said tube closes and opens said jaws, said jaws being arranged to be pressed into the ground around a dandelion or weed when in an open position relative to each other and to be closed around and against the root of said dandelion or weed by manual movement of said tube, and a rod within said tube adapted to be reciprocated therein to remove roots from said jaws after they have been removed from the ground.

3. In a dandelion and weed extractor, the combination of a tubular casing having a flanged disk member at its lower end provided with a plurality of lugs arranged at equidistances apart around its peripheral edge, a plurality of ground piercing jaws provided with offset lug portions pivotally connected through said offset lug portions to the lugs of said casing, said jaws being arranged to swing together in axial alinement with said casing, and provided with convergingly arranged ratchet teeth on their meeting faces, each of said jaws being provided with a recess in its meeting face edge, said recesses being arranged to register opposite to each other and positioned adjacent to the pivotal centers of said jaws, a disk secured to the lower end of said tubular casing and arranged to fit loosely in the recesses of said jaws, said casing being provided with a longitudinal cutaway portion at its upper end arranged to reduce its upper terminal end to one-half of its diameter and to form a semicircular open end portion that is arranged to terminate in a square shouldered portion, said tubular casing being provided with a handle portion at its upper circular end having a semicircular recessed hub portion registering with the semicircular recess in the cutaway portion of said casing, a handle on the upper end of said reciprocal movement tube, arranged to rest normally against the shoulder of said casing that forms the end of its cutaway portion, said tube and handle being so arranged relative to the pivotal centers of said jaws as to normally hold said jaws swung apart into an open position at a suitable diverging angle that will enable them to be readily pressed into the ground and to be closed together when said tube is moved upwardly, and a rod reciprocally mounted within said tube, having a hook at one end arranged to hook over the handle portion of said casing, and having its opposite end extending adjacent to said jaws and adapted to eject weeds and roots clinging to said jaws after they have been extracted from the ground.

4. The combination with an inner and outer tube slidable with respect to each other, toothed jaws pivotally attached to the lower end of one tube, and means carried by the other tube for spreading and contracting said jaws when the tubes are slid one upon the other, of a rod extending down through the inner tube and beyond its lower end, having a hooked upper end in normal engagement with the upper end of the outer tube, said outer tube having a semicircular portion cut away at its upper end forming a shoulder, and a handle on the inner tube which is adapted to abut against the said shoulder.

In testimony whereof I affix my signature in presence of two witnesses.

ABRAM T. AUTER.

Witnesses:
G. SARGENT ELLIOTT,
ADELLA M. FOWLE.